(12) United States Patent
Lee

(10) Patent No.: US 6,384,562 B1
(45) Date of Patent: May 7, 2002

(54) SCANNER MOTOR ACCELERATION METHOD

(75) Inventor: Chen-Ho Lee, Hsinchu (TW)

(73) Assignee: UMAX Data Systems Inc. (TW)

( * ) Notice: Subject to any disclaimer, the term of this patent is extended or adjusted under 35 U.S.C. 154(b) by 0 days.

(21) Appl. No.: 09/658,454

(22) Filed: Sep. 8, 2000

(30) Foreign Application Priority Data

Apr. 10, 2000 (TW) ........................................ 089106587

(51) Int. Cl.$^7$ ................................................ H02P 8/00
(52) U.S. Cl. ........................ 318/696; 318/69; 318/567; 318/568.1; 318/568.22; 318/569; 318/560; 318/571; 318/600; 318/610; 364/474.22; 364/474.24; 364/474.26; 364/474.33; 364/474.35
(58) Field of Search ........................ 318/69, 568.1, 318/568.22, 600, 610, 696, 560, 567, 569, 571; 364/474.22, 474.24, 474.26, 474.33, 474.35

(56) References Cited

U.S. PATENT DOCUMENTS

| | | | | | |
|---|---|---|---|---|---|
| 4,103,216 A | * | 7/1978 | Hayes | ........................ | 318/685 |
| 4,127,800 A | * | 11/1978 | Long et al. | .................. | 318/685 |
| 4,224,645 A | * | 9/1980 | Mauch | ........................ | 360/73 |
| 4,713,593 A | * | 12/1987 | Rodi et al. | .................. | 318/572 |
| 4,775,945 A | * | 10/1988 | Cavill et al. | ................. | 364/519 |
| 5,198,909 A | * | 3/1993 | Ogiwara et al. | ............ | 358/412 |
| 5,416,395 A | * | 5/1995 | Hiramatus et al. | .......... | 318/600 |
| 5,475,291 A | * | 12/1995 | Yoshida et al. | ........ | 318/568.22 |
| 5,479,354 A | * | 12/1995 | Husslein | ................ | 364/474.22 |
| 5,615,609 A | * | 4/1997 | Hill et al. | .................... | 101/183 |
| 5,929,575 A | * | 7/1999 | Hyodo | ........................ | 318/69 |
| 6,054,835 A | * | 4/2000 | Thiemann et al. | .......... | 318/685 |
| 6,222,301 B1 | * | 4/2001 | Sakai | ..................... | 310/316.01 |

* cited by examiner

Primary Examiner—Robert E. Nappi
Assistant Examiner—Tyrone Smith
(74) Attorney, Agent, or Firm—Troxell Law Office PLLC

(57) ABSTRACT

A scanner motor acceleration method that uses a software driver and a flexible process method to enable a scanner to perform fast scanning operation without increasing motor cost or complex hardware design. Motor acceleration and deceleration may be done through software control on existing scanner hardware which do not support acceleration and deceleration function. Through positioning and speeding mechanisms of existing scanner hardware, and software which may be changed flexibly, scanner positioning function may be accurately performed without deviations.

3 Claims, 3 Drawing Sheets

SCANNER MOTOR ACCELERATION METHOD

FIELD OF THE INVENTION

This invention relates to a scanner motor acceleration method and particularly to a method for accelerating or decelerating scanner motor through a software driver for the scanner hardware which does not support acceleration and deceleration function.

BACKGROUND OF THE INVENTION

Scanner is a widely used computer peripheral device nowadays. Its function and features are closely tied to the computer. Some scanners do not have CPU-controlled motor and do not support motor acceleration and deceleration function. In such a case, scanner acceleration and deceleration control is done by means of a software driver located in the host. The smoothness of acceleration and deceleration curve varies and depends on a lot of factors such as degree of software environment complexity, interface bus loading, and the likes.

For a scanner to achieve fast scanning operation, scanner motor is a critical factor. When the scanner motor is CPU-controlled, motor acceleration and deceleration may be achieved easily. When the scanner motor is not CPU-controlled, the control function are mostly relegated to the CPU through remote control following certain command protocol. In such cases, the CPU usually cannot perform real time control for the scanner and may easily result in non-synchronizing or not accurate positioning problems. The following is a summary of conventional methods for supporting fast scanning operation and their trade off:

1. Using fast motor, but the cost is higher.
2. Using ordinary motor, CPU supports acceleration and deceleration function. CPU and firmware are more expensive.
3. Using ordinary motor, hardware provides acceleration and deceleration function. Design is more complex. Acceleration and deceleration profile is less flexible due to hardware restriction.
4. Using ordinary motor, software driver provides acceleration and deceleration function. It may cause positioning problem, and may fail to accelerate to a speed desired within required time frame.

All these issues are still pending and beg for improvement.

SUMMARY OF THE INVENTION

It is an object of this invention to provide a scanner motor acceleration method to overcome problems resulting from CPU efficiency or interface for achieving acceleration required and accurate positioning desired.

It is another object of this invention to provide a scanner motor acceleration method for enhancing scanning flexibility and speed without increasing motor cost or hardware design complexity, and to perform acceleration required through a software driver and a flexible process under no hardware support environments.

The method according to this invention includes setting an initial scanning data, determining if the scanner reach the position and speed desired, changing scanning parameters and proceeding acceleration to reach the position and speed desired, and performing constant speed scanning process when reaching the position and speed desired until scanning job is finished. All this is achieved by using existing positioning and speeding mechanisms in the scanner and controlling of software changes.

BRIEF DESCRIPTION OF THE DRAWINGS

The invention, as well as its many advantages, may be further understood by the following detailed description and drawings, in which.

DETAILED DESCRIPTION OF THE PREFERRED EMBODIMENT

This invention aims at providing a scanner motor acceleration method that uses a software driver to operate a scanner with existing hardware circuit for getting fast scanning speed and other functional flexibility without increasing motor cost or hardware design complexity. Through the software driver, it may also accelerate or decelerate the motor of the scanner which does not have acceleration and deceleration hardware support function, and perform acceleration or deceleration before motor reaching designated position. It may also enable acceleration taking place concurrently with scanning operation when motor acceleration buffer zone is not sufficient.

The method according to this invention includes setting an initial scanning data, determining if the scanner reach the position and speed desired, changing scanning parameters and proceeding acceleration to reach the position and speed desired, and performing constant speed scanning operation when reaching the position and speed desired until the scanning job is finished. The processes set forth above are accomplished through a software and the positioning and speeding mechanisms of the scanner hardware.

Figure 1:
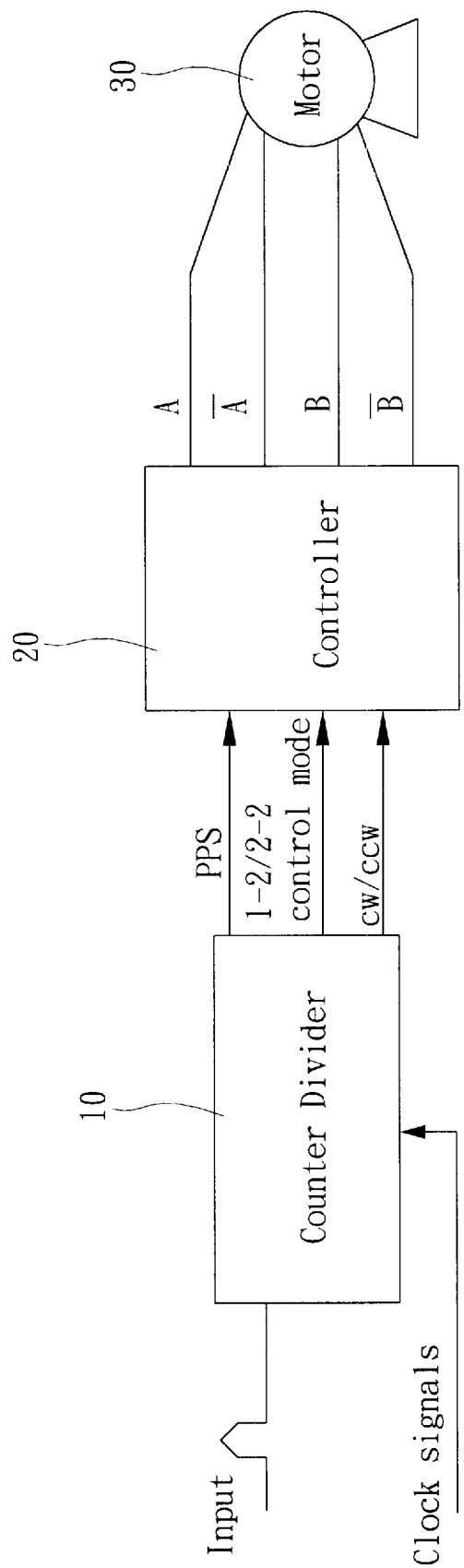
FIG. 1 is a schematic electric circuit diagram for a conventional scanner motor.

FIG. 1 shows a schematic electric circuit diagram for a conventional scanner motor. The motor 30 (which may be a step motor) is driven by signals A,A',B and B' output from a controller 20. The controller 20 receives various signals which includes PPS (Pulse Per Second), 1-2/2-2 control mode selection signals and rotation/counter rotation control signals(cw/ccw). The PPS signals is provided by a Counter Divider 10 which receives an input and time pulse signals from external sources. This invention uses the control pulse wave of the time pulse signal to control motor rotation.

In this invention, software may be flexibly changed to control scanner hardware positioning and speeding mechanism without producing deviations. Even though software change cannot be done real time, this invention allows the software driver to change speed within a reasonable time range. Hence even if software change frequency is not even, it only results in different acceleration curve. The object of speed acceleration and positioning may still be achieved. FIG. 2 in the following offers some of the comparisons.

Figures 2A, 2B, 2C:
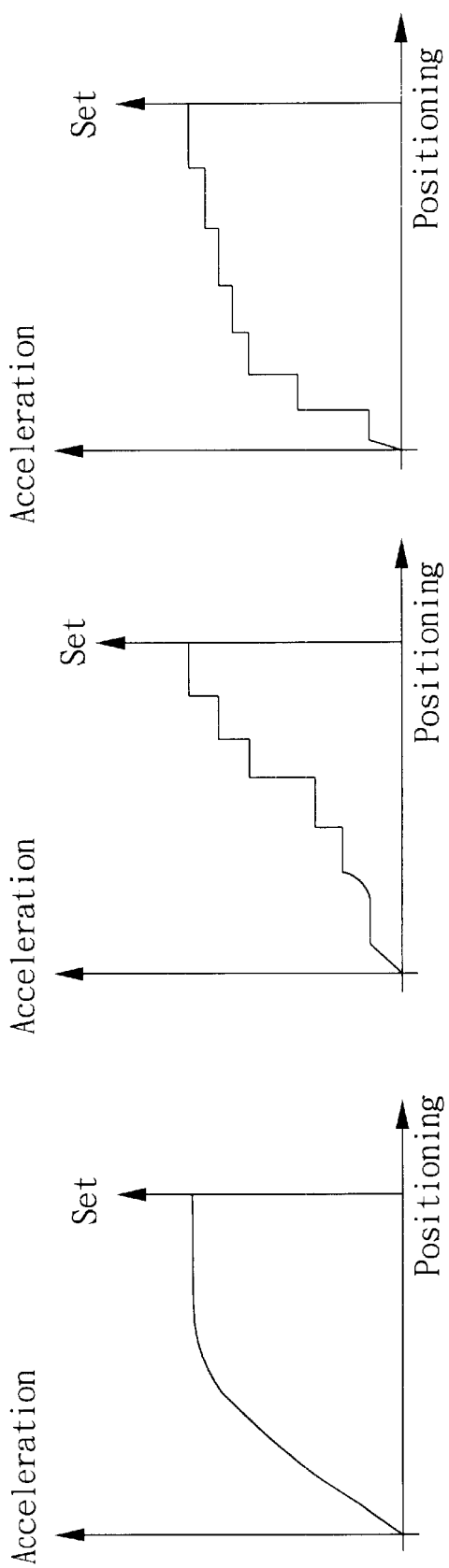
FIG. 2A is a profile diagram of acceleration and positioning for a conventional scanner motor.
FIG. 2B is a variation of the profile diagram of acceleration and positioning for a scanner motor.
FIG. 2C is another variation of the profile diagram of acceleration and positioning for a scanner motor.

FIG. 2A shows a profile diagram of acceleration and positioning for a conventional scanner motor which is controlled by a CPU. It has a smooth curve. FIG. 2B is a variation of the acceleration and positioning profile for the scanner motor that changes by step and has a greater change rate in the middle portion. FIG. 2C is another variation of acceleration and positioning profile for the scanner motor which also changes by step and has a greater change rate at the initial stage. Both profile patterns shown in FIGS. 2B and 2C are acceptable for scanner motor acceleration and deceleration use.

Figure 3:
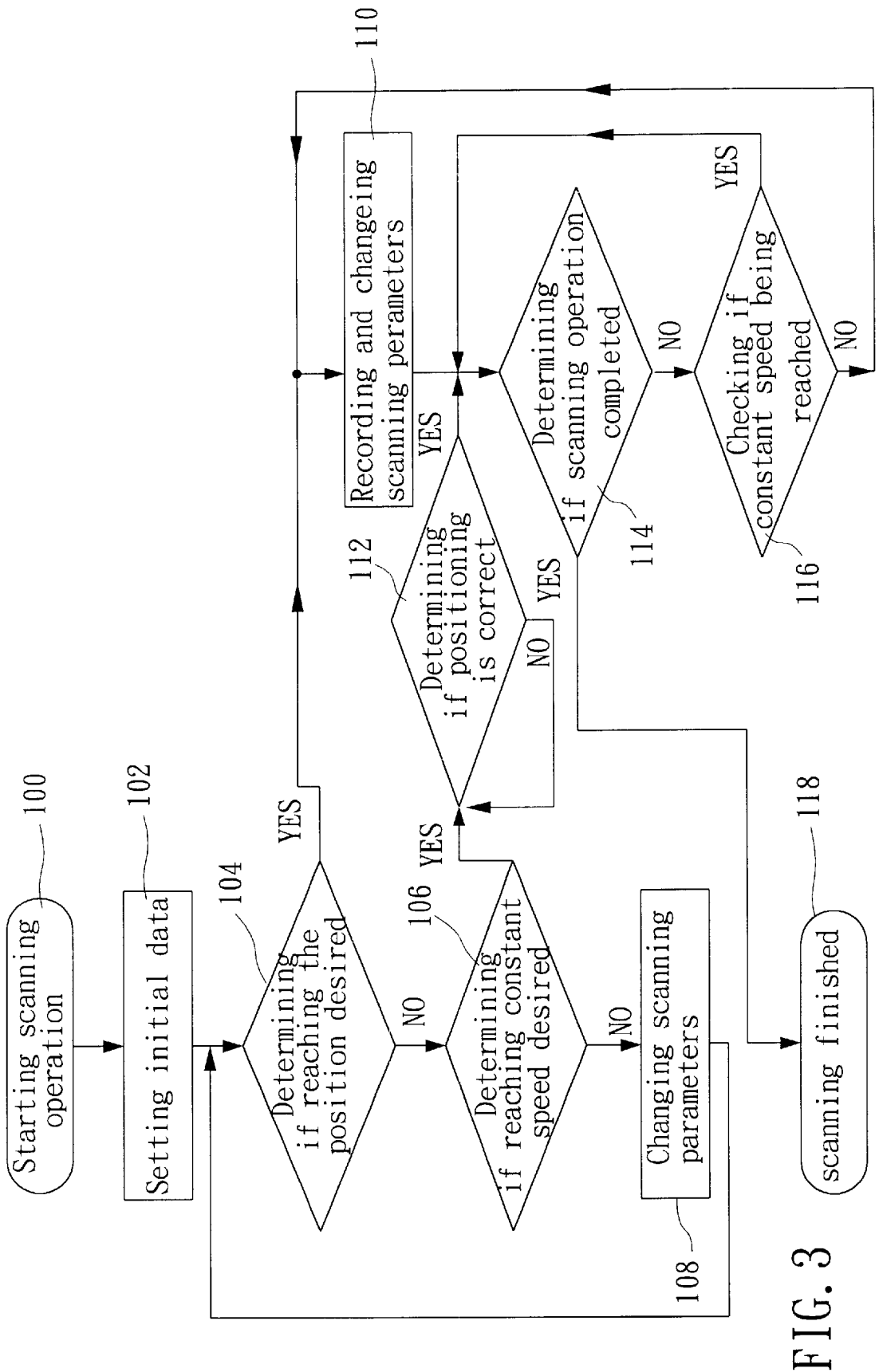
FIG. 3 is a process flow chart of this invention.

FIG. 3 shows a software process flow of this invention. It begins by starting scanning operation 100, then setting initial data 102, determining if reaching the position desired 104, recording and changing scanning parameters 110 if the step 104 outcome is positive, otherwise (negative at the step 104) determining if reaching constant speed desired 106, changing scanning parameters 108 if the step 106 outcome is negative, then goes back to the step 104 for another cycle of acceleration process. If the step 106 outcome is positive, then determining if positioning is correct 112. Positive result at the step 112 will lead to determining if scanning operation completed 114. Negative result at the step 114 will lead to checking if constant speed being reached 116. Positive result at the step 116 will lead to continuous scanning (as correct positioning is reached), and negative result will lead to recording and changing scanning parameters 110. Through this process, scanning and acceleration are proceeded concurrently. Finally, positive result at the step 114 will lead to scanning finished 118.

Aforesaid processes have the following characteristics:

1. The software detects systems operation environments and chooses a suitable acceleration curve for acceleration and positioning operation.
2. Software control of this invention is built in the setting of acceleration curve process. The acceleration curve may be dynamically adjusted and changed according to environment change to better suit actual needs.
3. The software of this invention may be made modular and preset for scanning type.
4. The software of this invention allows change of exposure method and motor operation mode during scanning operation. Control of acceleration curve calculation may be done during scanning operation. Control factors may include dynamic adjusting gain based on exposure time, compensation after image being obtained through software control and the likes.

Through this invention, scanner motor acceleration may be achieved without hardware change. And it may be done flexibly at a lower cost.

It may thus be seen that the objects of the present invention set forth herein, as well as those made apparent from the foregoing description, are efficiently attained. While the preferred embodiments of the invention have been set forth for purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A method for controlling the acceleration of a scanner drive motor comprising the steps of:

a) setting initial scanning parameters including a desired speed of the scanner at a desired position;
   b) sensing the speed of the scanner;
   c) sensing the position of the scanner;
   d) comparing the sensed speed and position to the desired speed and position; and,
   e) adjusting an acceleration curve of the scanner drive motor in a plurality of discrete steps until the sensed speed and position matches the desired speed and position.

2. The method of claim 1 wherein the discrete steps in a middle portion of the acceleration curve are greater in magnitude than the discrete steps in end portions of the acceleration curve.

3. The method of claim 1 wherein the discrete steps in an initial portion of the acceleration curve are greater in magnitude than the discrete steps in a remainder of the acceleration curve.

* * * * *